United States Patent [19]
Essam

[11] Patent Number: 6,089,269
[45] Date of Patent: Jul. 18, 2000

[54] PARTIALLY STROKING AN EMERGENCY VALVE

[75] Inventor: Derek Mark Essam, Eastbourne, United Kingdom

[73] Assignee: Drallim Industries Ltd., East Sussex, United Kingdom

[21] Appl. No.: 09/325,863

[22] Filed: Jun. 4, 1999

[30] Foreign Application Priority Data

Jun. 5, 1998 [GB] United Kingdom ............... 9812180

[51] Int. Cl.⁷ .................................................. F16K 31/02
[52] U.S. Cl. ............................... 137/624.15; 137/624.13
[58] Field of Search ........................ 137/624.11, 624.15, 137/624.13

[56] References Cited

U.S. PATENT DOCUMENTS 4,211,197  7/1980  Kawai .
4,664,602  5/1987  Gordon ........................ 137/624.15 X

FOREIGN PATENT DOCUMENTS 883506  11/1961  United Kingdom .

Primary Examiner—Kevin Lee
Attorney, Agent, or Firm—Dowell & Dowell, P.C.

[57] ABSTRACT

An emergency valve controlled by an electrical signal on a control line which includes a partial stroke controller connected to the control line and providing a control signal for a predetermined time to cause the emergency valve to partially stoke.

9 Claims, 4 Drawing Sheets

PARTIALLY STROKING AN EMERGENCY VALVE

BACKGROUND OF THE INVENTION

The present invention relates to partially stroking (ie partially opening or partially closing, whichever is relevant) an emergency shut down or isolation valve.

BRIEF DESCRIPTION OF THE RELATED ART

The invention will be described with particular reference to emergency shut down valves which are used, for example, in processing industries such as oil refineries or oil rigs, the valve being provided in an oil pipeline, the arrangement being such that in the event of an emergency, the valve will close. However, the emergency valve may be an emergency isolation valve which in an emergency shuts down and isolates part of a process or an emergency blow down valve which in an emergency opens to pass air or other fluid to, for example, blow down the process.

Whilst we shall describe the invention with particular reference to valves for use in isolating the flow of oil, it will be understood that other valves controlling the flow of other fluids comprising a liquid or gas may be stroked by means according to the invention.

One of the difficulties with such emergency valves is that particularly where an oil refinery or oil rig is in continuous operation, in view of the cost of shutting any particular line whilst carrying out maintenance work, the emergency valves are not moved between maintenance intervals, which may be several years. As a consequence, over that period of time, because of the deposit of dirt or other material, the valve may become stuck and not be operable in an emergency. It is highly desirable to be able to test the valves at more frequent intervals to ensure that they are operable and it is preferable that the valves should be tested without closing down the oil pipeline in which they are mounted.

The emergency valves may comprise a variety of forms, for example, gate valves, butterfly valves, rotary or ball valves. The emergency valve is operated by an actuator. One method of operation of the actuator uses hydraulic or gas pressure to retain the valve in its normal, eg closed, position. In the case of a single acting actuator when the emergency valve is to be shut, the hydraulic or gas pressure is released and a metal spring or other mechanism closes the valve. In the case of a double acting actuator, the medium controlling the actuator is redirected to close the valve. The application of the hydraulic or gas pressure is normally controlled by one or more electrically controlled solenoid valve, the electrical signal (voltage) being provided by an electrical control line. Any interruption of the electrical signal operates the solenoid valves to release or divert the hydraulic or gas pressure and hence closes the valve.

In another arrangement the actuator is an electric motor controlled by an electrical signal on a control line.

SUMMARY OF THE INVENTION

We shall describe hereafter an arrangement in which the emergency shut down valve may be tested for operation by only partially stroking (closing) the valve, it being ascertained that so long as the valve begins to close, it is not necessary to close it fully since the initial movement of the valve is only necessary to prove that the valve is free to move and provides evidence that the valve would close completely.

According to a first aspect, the present invention provides partial stroke control means for partially stroking (ie opening or closing) an emergency valve of the type controlled by an electrical signal on a control line, said means comprising means for connection to said control line, said means including means for providing, on said control line, a relevant electrical signal for a predetermined length of time to cause said emergency valve to partially stroke. In or for an emergency valve of the type controlled by an electrical signal on a control line, a partial stroke controller comprising a connector to be connected to said control line, an electrical signal generator, in use connected to said control line providing, on said control line, a relevant electrical signal for a predetermined length of time to cause said emergency valve to partially stroke. Said means may be controlled by a manual or other control switch.

The time taken for different emergency valves to open or close will vary depending upon their size, material flowing through them, and the motor driving them, and so to provide for this, in a preferred aspect, the partial stroke controller may include at least one variable timer and a relay.

Where the emergency valve is of a type where application of an electrical signal keeps it open, and an absence of that signal causes it to be closed by, for example, a spring, said control line is adapted to pass through said partial stroke controller from an input terminal to an output terminal, said input terminal and output terminal being connected electrically through a normally closed relay and there is provided a variable timer operable to apply power to said normally closed relay to open said relay for a variable time.

In many applications, fail safe redundancy is required and in that case a second timer may be provided in series with said first mentioned timer, so that even if one of the timers fails and continues to apply power to said normally closed relay to keep it open, the other timer will interrupt the power supply.

Similarly, said relay may be coupled in parallel with a second relay, said second relay being controlled in the same way as the first relay by one or two of said timers, whereby, if either of said relays fails in said open position, the other relay will close to electrically connect said input and output terminals.

In certain circumstances it might be possible to operate said partial stroke controller successively in the time interval before said emergency valve has fully opened/closed after the partial stroking and in that way successive strokes might cause the emergency valve to fully open/close. To avoid this, there may be provided a further timer controlled to start to time when said first timer closes said relay, said further timer being arranged to interrupt operation of the control switch for a period of time sufficient for a complete cycle of operation to take place.

One of the merits of using the control line to partially stroke the emergency valve is that there is no interference with the mechanism of the emergency valve and, indeed, the size, type of operation, etc, of the valve is irrelevant. Thus a single partial stroke controller may be provided for partially stroking any type of emergency valve. It is simply necessary to adjust the variable timer means to suit the relevant emergency valve.

BRIEF DESCRIPTION OF THE DRAWINGS

A preferred embodiment of the invention will now be described by way of example and with reference to the accompanying drawings in which.

DESCRIPTION OF THE PREFERRED EMBODIMENTS

Figure 1:
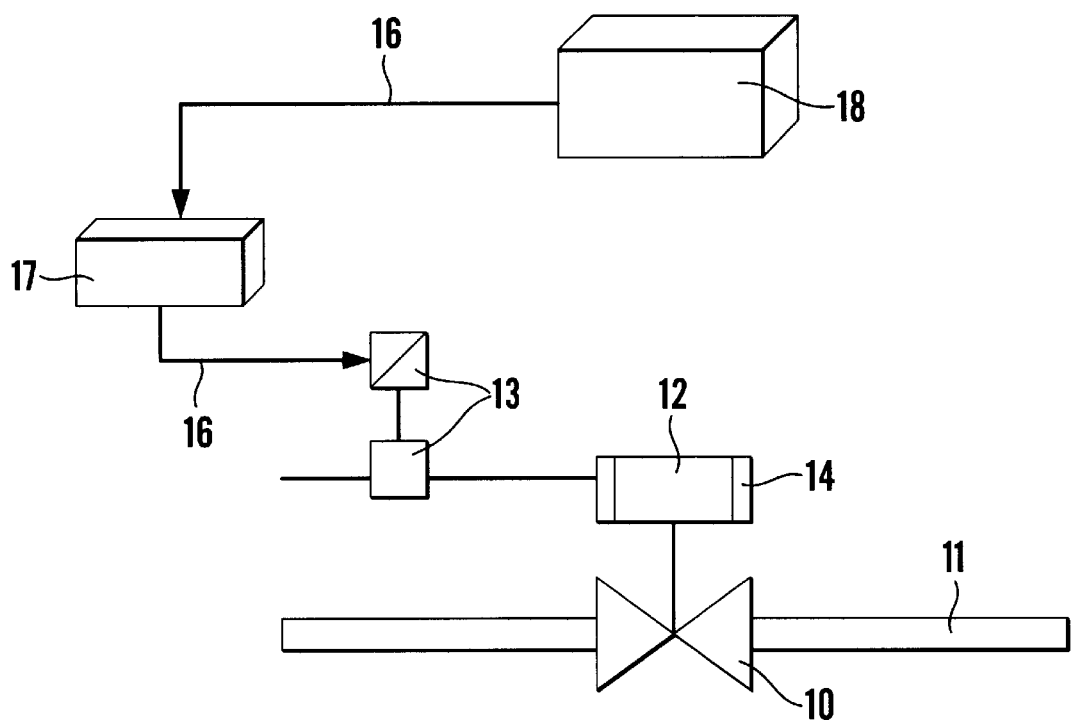
FIG. 1 is a diagrammatic view of an emergency valve in a pipeline with a single hydraulic or pneumatic acting actuator connected to a partial stroke controller for the emergency valve.

Referring to FIG. 1 there is shown an emergency valve 10 in a pipeline 11, the emergency valve being arranged so as to close off the pipeline 11 to prevent the flow of fluid through the pipeline in an emergency. The valve 10 is operated by a single acting actuator and is held open by gas or hydraulic fluid applied at pressure to one side of a piston in a piston/cylinder unit 12, the gas or hydraulic pressure fluid being applied to the piston 12 via a solenoid (or other electrically controlled) valve 13, the solenoid valve in the first position applying the pressure to the piston/cylinder unit 12 and in a second position isolating the piston/cylinder unit 12 from the gas or hydraulic pressure. In the second position of the solenoid valve 13, in the absence of gas or hydraulic pressure to hold the valve 10 in the open position, the valve is immediately closed by means of a metal spring 14 of other means.

The solenoid valve 13 is held in the position in which pressure is applied to the piston/cylinder unit 12 when an electrical voltage is applied on an electrical control line 16 and when the voltage on the electrical control line 16 falls to zero, then the solenoid valve moves to the position in which the piston/cylinder unit 12 is isolated from gas or hydraulic pressure. The system is therefore failsafe in that failure of the electrical supply to the solenoid valve, or, failure in any respect in the piston/cylinder unit, will cause the valve 10 to be closed by the metal spring 14 or other means.

Figure 2:
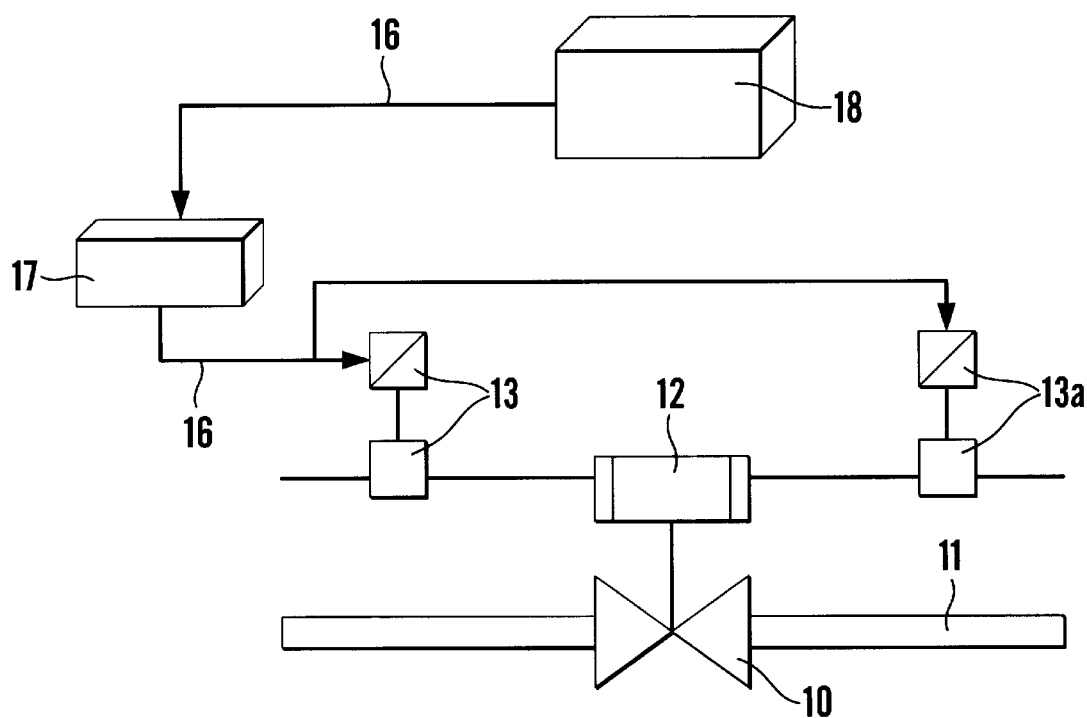
FIG. 2 is similar to FIG. 1, but includes a double acting actuator.

In the arrangement of FIG. 2, where the valve is operated by a double acting actuator, there are provided two solenoid valves 13, 13a, to alternately direct fluid to opposite sides of piston/cylinder unit 12. The function is that 13 can be say normally open, allowing pressure to one side of the actuator whilst 13a can be in a condition allowing the gas/fluid to atmosphere or tank, by changing the state of these devices, with the actuation of the timer/relays, gas/fluid would be allowed to flow in the opposite direction, thereby closing the emergency valve.

Figure 3:
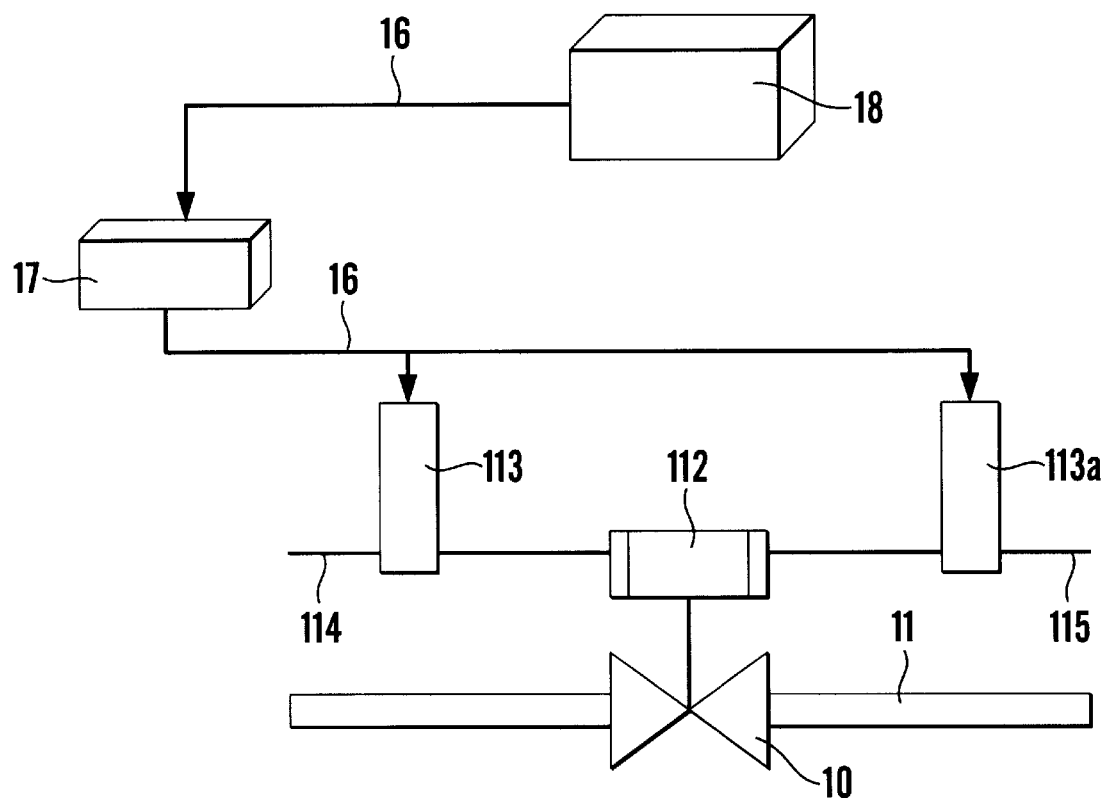
FIG. 3 is similar to FIG. 1, but includes an electric actuator, and, FIG. 4 is a diagrammatic view of the electrical control circuit within the partial stroke controller.

In the arrangement of FIG. 3, the valve 10 is operated by a reverse electric motor 112, the relevant electric power being provided from line 114 or 115 and being controlled by solenoid operated control switches 113, 113a. When solenoid switch 113 is closed power from line 114 is applied to motor 112 which causes the valve 10 to close, and similarly when alternate solenoid switch 113a is closed (switch 113 being open) power from line 115 is applied to motor 112 to open the valve 10. In the arrangement shown, an electrical signal on line 16 will cause solenoid switch 113 to be closed and 113a to be open, and an absence of an electrical signal on line 16 will cause the solenoids 113, 113a, to switch to their opposite configuration.

Figure 4:
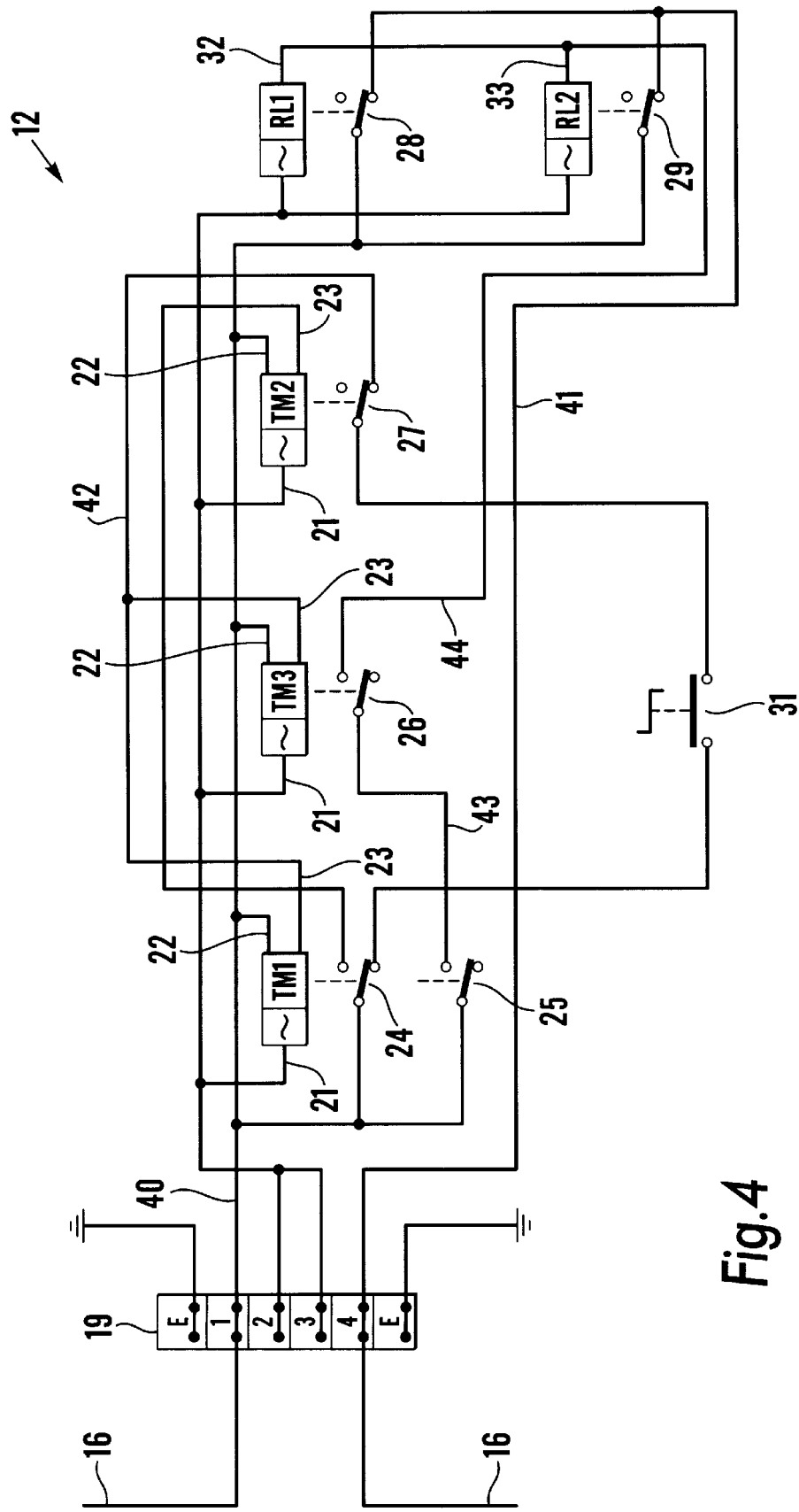

Referring to FIG. 4 it will be seen that the electrical control line, which is connected to an electrical voltage through a partial stroke control means 17 in accordance with the invention.

Referring to the partial stroke control means 17 set out in more details in FIG. 2, there is shown a connector block 19 to which the input terminal 1 is connected via the electrical control line 16 to the voltage supply from a control means 18. The terminal 4 comprises the output terminal which is connected via the electrical control line 16 to the solenoid valve 13/solenoid valves 13, 13a/solenoids 113, 113a.

The exact circuit diagram of the partial stroke control means illustrated in FIG. 2 will not be described in detail as that is readily apparent from the Figure. However, there are provided 3 timer circuits, TM1, TM2, TM3, each powered through terminals A2 and A1 and controlled by signals on relevant control terminal B1. Timer TM1 controls switches 24 and 25 as a relay. Similarly timer TM3 controls switch 26 and timer TM2 controls switch 27.

There are also provided two relays RL1, RL2, in parallel which control switches 28, 29 respectively and a key operated spring return switch 31 is provided.

In operation, in a normal position, the switches are in the positions shown in FIG. 2. Thus the input voltage from line 16 through the input terminal 1 passes along line 40 through the parallel switches 28, 29 to line 41 and thence to the output terminal 4 and control line 16 to the solenoid valve 13/solenoid valves 13, 13a/solenoids 113, 113a. The voltage on line 40 is applied to input terminals of switches 24 and 25, input switch 25 thereby isolating that voltage, but switch 24 connecting that voltage to the input terminal of the key operated spring return switch 31. That switch 31 is normally open. The voltage on line 40 is otherwise used to power the timers TM1, TM2, TM3 and the relays RL1 and RL2. When it is desired to partially stroke the emergency shut down valve 10, a key has to be inserted into the switch 31 to prevent unauthorised operation and switch 31 is closed. The effect of that is to connect the voltage from line 40 via switch 24 to switch 27 and thence to line 42 which connects that voltage to the control terminals 23 of timers TM1 and TM3. This immediately forces the timers TM1 and TM3 to change the state of switches 24, 25 and 26 to the opposite configuration for a predetermined variable length of time. As a result the voltage from line 40 passes through switch 25 to line 43 and thence to switch 26, and through to line 44, and thence to the control terminals 32, 33 of relays RL1, RL2. This causes the relays to open switches 28, 29 to interrupt the power supply to the output terminal 4. As a result in FIG. 1, the solenoid valve 13 will be switched to isolate the pressure to the piston cylinder unit 12 in FIG. 2 the solenoid valves 13, 13a reverse the supply of pressure to the piston/cylinder unit 12 and in FIG. 3 the solenoid systems are reversed and the valve 10 will begin to close.

It will also be noted that as the switch 24 changes to its other configuration, power to the switch 31 is isolated, but power is supplied to the control terminal 22 of timer TM2. As a result, the timer TM2 opens the switch 27 for a predetermined variable length of time.

After a predetermined period of time (which need not be exactly the same time in the two cases) and which is adjustable, the timers TM1, TM3 and the switches 24, 25, 26 will revert to the position shown in FIG. 2. This period of time should be set to be less than the time taken for the valve 10 to fully close and indeed might be set for a period of time equivalent to the valve 10 moving over less than 25% of its full stroke. When TM1, TM3 revert to the position shown in FIG. 2, the movement of the switch 25 and/or 26 will interrupt the power supply to the control terminals 32, 33 of the relays RL1, RL2 and so the relays will move the switches 28, 29 to the position shown in FIG. 2. This will reconnect the voltage from the input terminal 1 to the output terminal 4 to cause the valve 10 to open.

It will be understood that if either of the timers TM1, TM3 fail then the power from the input terminal 1 through line 43, 44 to the control terminals 32, 33 of the relays will be interrupted by the other timer operating its relevant switch. Similarly if either of the relays 32, 33 fails to move the switches 28, 29 back to their normal position, then again, because the two switches 28, 29 are in parallel, either one can provide the connection between input terminal 1 and output terminal 4. In that way there is redundancy in both the timers TM1, TM3 and the relays RL1, RL2 and their switches.

The timer TM2 is arranged to have a longer time before switching 27 back to its normal position than the timers TM1, TM3. The reason for this is that it would otherwise be possible, once the timers TM1, TM3 have returned the switches 24, 25, 26 to the position shown in FIG. 2, for an operator to operate switch 31 again before the valve 10 has returned to the fully open position and in that circumstance by successive operation of the switch 31, one could cause the valve 10 to move to a fully closed position. Timer TM2 and switch 27 isolate the switch 31 until a period of time which is sufficient for the valve 10 to open fully. Thus timer TM2 is set so as to maintain switch 27 open from the time the switch 31 is first closed through to a period of time which will allow the valve 10 to open in all circumstances.

One of the advantages of the arrangement of partial stroke control means set out above is that it can be simply inserted into the electrical control line 18. This is particularly useful where, for example, the valve is remote, for example, is provided on the seabed.

As noted above the various timers TM1, TM2, TM3 are of variable timing. Particularly timers TM1, TM3 need to be adjusted for the operation of an individual valve 10. Thus for example when first installing the system, the timers TM1, TM3 can be turned down so as to operate for the minimum period, and the system operated to see how far the valve 10 strokes, and the time of TM1, TM3 can be increased slowly until the valve 10 strokes to the desired extent, for example, through 25% of its stroke.

The invention is not restricted to the details of the foregoing example.

What is claimed is:

1. In an emergency valve controlled by an electrical signal on a control line the improvement comprising, a partial stroke controller adapted to be connected to said control line, and an electrical signal generator adapted to be connected to said control line providing, on said control line, an electrical signal for a predetermined length of time to cause said emergency valve to partially stroke.

2. The emergency valve as claimed in claim 1, including a manual switch, said electrical signal generator being controlled by said manual switch.

3. The emergency valve as claimed in claim 2, including a control switch, said electrical signal generator being controlled by said control switch.

4. The emergency valve as claimed in claim 1 including at least one variable timer and a relay.

5. The emergency valve as claimed in claim 1 including an input terminal and an output terminal each connected to said control line, said input terminal and output terminal being connected electrically through a normally closed relay and a first variable timer provided to apply a signal to said normally closed relay to open said relay for a variable time.

6. The emergency valve as claimed in claim 5, wherein a second timer is provided in series with said first variable timer, wherein if one of said timers fails and continues to apply a signal to said normally closed relay to keep it open, the other of said timers will interrupt the signal.

7. The emergency valve as claimed in claim 5, wherein a second relay is coupled in parallel with said first relay, said second relay being controlled by said first variable timer, wherein, if either of said relays fails in said open position, the other relay will close to electrically connect said input and output terminals.

8. The emergency valve as claimed in claim 5 including a further timer controlled to start to time when said variable timer closes said relay, said further timer being arranged to interrupt operation of said control switch for a period of time sufficient for a complete cycle of operation to take place.

9. An emergency valve comprising:

a control line for receiving an electrical signal;

a partial stroke controller connected to said control line and including an electrical signal generator, a control switch, and a normally closed relay controlled by a variable timer, said partial stroke controller being operable by operation of said control switch to apply a signal to said control line for a predetermined length of time to cause the emergency valve to partially stroke.

* * * * *